United States Patent
Battini et al.

(10) Patent No.: US 6,919,792 B1
(45) Date of Patent: Jul. 19, 2005

(54) CONTROL DEVICE AND METHOD IN A SYSTEM OF HOUSEHOLD APPLIANCES

(75) Inventors: Fabien Battini, Thorigne-Fouillard (FR); Benoit Guerin, Rennes (FR)

(73) Assignee: Thomson Licensing Inc., Boulogne-Billancourt (FR)

( * ) Notice: Subject to any disclaimer, the term of this patent is extended or adjusted under 35 U.S.C. 154(b) by 0 days.

(21) Appl. No.: 09/509,969

(22) PCT Filed: Oct. 19, 1998

(86) PCT No.: PCT/FR98/02240

§ 371 (c)(1),
(2), (4) Date: Apr. 3, 2000

(87) PCT Pub. No.: WO99/21325

PCT Pub. Date: Apr. 29, 1999

(30) Foreign Application Priority Data

Oct. 17, 1997 (FR) .......................................... 97 13023

(51) Int. Cl.[7] .............................................. G05B 10/00

(52) U.S. Cl. ...................... 340/5.32; 340/10.6; 715/733

(58) Field of Search .............................. 340/5.32, 10.6, 340/825.57; 715/733; 345/329, 357, 970; 709/201, 202

(56) References Cited

U.S. PATENT DOCUMENTS 6,198,479 B1 * 3/2001 Humpleman et al. ....... 345/329

FOREIGN PATENT DOCUMENTS

EP 0626635 A2 11/1994 ............. G06F/3/00

OTHER PUBLICATIONS

Bob Margolin, Smarter Stuff, Jun. 1997 Byte USA.
International Search Report.

* cited by examiner

Primary Examiner—Michael Horabik
Assistant Examiner—M Shimizu
(74) Attorney, Agent, or Firm—Joseph S. Tripoli; Joseph J. Laks; Paul P. Kiel

(57) ABSTRACT

A method and apparatus for controlling a plurality of appliances in a home network, in which each appliance in the network has an associated descriptor comprising information for controlling the appliance. A control device for controlling the plurality of appliances includes a microprocessor for loading and processing descriptors associated with the appliances and a graphics generator for generating a display of markup language pages or page parts based on the descriptor information. The control device uses descriptors of a plurality of appliances to aggregate appliance control functions of the same type for a plurality of appliances in order to display aggregated functions on a single page.

11 Claims, 4 Drawing Sheets

CONTROL DEVICE AND METHOD IN A SYSTEM OF HOUSEHOLD APPLIANCES

FIELD OF THE INVENTION

The invention relates to a control device and method in a domestic-appliance network.

Domestic appliance should be understood as meaning at least one domestic appliance, such as a video and/or audio appliance (for example, a television set, a tape recorder, a hi-fi system, etc.) and/or at least one electrical appliance (for example, a microwave oven, a refrigerator, a circuit breaker, etc.)

Control of a domestic appliance should be understood as meaning the management of various items of information, such as information allowing the appliance to be set, information relating to the appliance's current operation, information relating to the technical characteristics of the appliance or else safety guidelines which are to be observed.

DESCRIPTION OF RELATED ART

According to the prior art, the information relating to setting, the technical characteristics and the safety guidelines for an appliance is contained in the printed booklet constituting the appliance's instructions. Once this information is known, the user sets the appliance by making adjustments to the appliance itself either directly or, in certain cases, using a remote control.

The information relating to the current operation of an appliance is displayed on the front of the appliance. As non-limiting examples, the front of a compact disc player displays the number of the disc's track number currently being played, or a microwave oven displays the power to which it has been set.

A domestic appliance is thus controlled on the basis of a variety of information which the user employs when making multiple adjustments.

When a user wishes to operate a plurality of domestic appliances simultaneously, he thus has to make adjustments to each of them. The number of operations which the user needs to carry out is thus greatly increased, and this very fact results in real drawbacks. Thus, for example, a user wishing to record a television programme received by a first appliance on a second appliance needs to program each of the appliances separately.

The invention does not have these drawbacks.

BRIEF SUMMARY OF THE INVENTION

Specifically, the invention relates to a control device in a domestic-appliance network, wherein each appliance has an associated descriptor comprising a set of HTML pages or page parts for controlling said appliance, said device having
  means for loading and processing descriptors associated with the appliances,
  means for displaying HTML pages or page parts for the descriptors loaded, a descriptor comprising configuration data which identifies an appliance as a source and/or a receiver of a data type, said control device using configuration data for a plurality of appliances to create at least one configuration page in order to allow the user to specify the connections between appliances.

According to one particular illustrative embodiment, the display means comprise a television set. These means can also comprise a video monitor, an LCD or plasma screen, a display of the light-emitting-diode type or another type of display.

According to one particular example, an IEEE 1394 interface, the loading and processing means comprise a microprocessor and a memory. However, depending on the design, in particular depending on the type of communication bus in the network, the interface can be different and, in particular, wireless. Furthermore, the microprocessor can be replaced by a microcontroller or another type of data-processing device. Similarly, the memory can be of the random access memory or programmable read-only memory type, depending on the type of use envisaged.

According to one particular aspect of the invention, the control device analyses the descriptors obtained to determine similar functions in these descriptors, for example audio volume settings, and creates HTML pages which combine these functions. This characteristic is patentable per se.

One advantage of the invention is that it allows various appliances operating at the same time to be controlled centrally.

BRIEF DESCRIPTION OF THE DRAWINGS

Other features and advantages of the invention will become apparent on studying embodiments of the invention with reference to the appended figures, in which.

In all the figures, the same reference symbols denote the same elements.

DETAILED DESCRIPTION OF THE INVENTION

Figure 1:
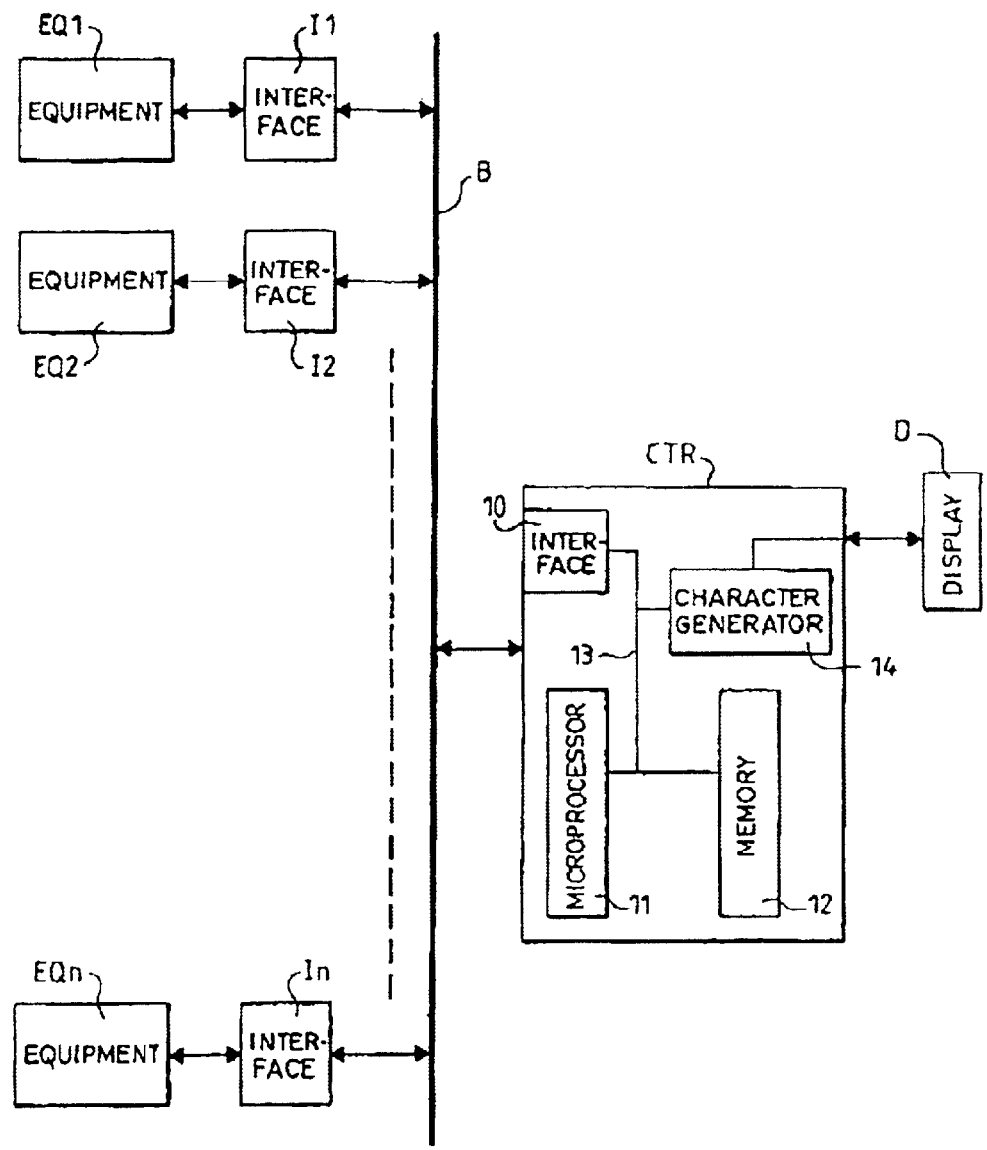
FIG. 1 shows a system for controlling domestic equipment using a graphical screen display according to a first embodiment of the invention.

FIG. 1 shows a system for controlling domestic equipment using a graphical screen display according to a first embodiment of the invention.

The system shown in FIG. 1 comprises n items of domestic equipment EQ1, EQ2, ..., EQn, n being an integer greater than or equal to 1.

Each item of domestic equipment (EQj (j=1, 2, ..., n) is connected to an interface Ij. According to a first embodiment of the invention, the item of domestic equipment EQj and the interface Ij are independent devices connected to one another by means of a connection. According to a second embodiment of the invention, the interface Ij is integrated in the item of domestic equipment EQj in such a manner that all that is formed is a single appliance.

The various interfaces Ij are connected to one another and to a control device CTR by means of an electrical network B. The control device CTR is connected to a display device D. According to the preferred embodiment of the invention, the electrical network B is a data bus, such as the bus defined by IEEE standard 1394.

The display device D may be, for example, a television set or else a computer of the PC (personal computer) type.

For each item of domestic equipment, the information which can be displayed on the screen of the device D is, for example, all or some of the information listed below:

Information allowing the item of domestic equipment to be set and operated. This information can vary from one moment to the next at a greater or lesser rate. It is obtained from instantaneous measurements carried out, for example at regular intervals of time, on the appliance which is operating. For example, it may be information giving the remaining playing time on a track of an audio compact disc or else information giving the temperature of an electric oven.

Configuration information. This information specifies how various items of domestic equipment can be connected to one another. To show this information on a graphical display, it is necessary to know which are the various items of domestic equipment to be configured so that the chosen configuration(s) can be worked out.

Technical information describing the item of domestic equipment. This information is not likely to change over time. It is generally set out in a booklet supplied with the equipment. For example, it may be the serial number of the appliance, its rated power consumption, or else its dimensions (height, width, depth).

Information describing the operating instructions and the safety guidelines for the appliance. This information is traditionally noted in the appliance's instructions.

Commercial information relating to the manufacturer and/or the distributor of the appliance. For example, this may involve commercial promotions or else additional goods and services linked directly or indirectly to the appliance.

Thus, one advantage of the invention is that it allows a set of very varied information, relating both to a single appliance and to a set of appliances, to be kept centrally at the user's disposal at all times.

According to the invention, the information mentioned above is described, for each item of domestic equipment, as an electronic form in the interface circuit Ij. Electronic form should be understood as meaning a set of computer data which can be communicated by the interface Ij and a set of electronic circuits allowing this computer data to be communicated.

In the description which follows, the set of computer data which can be communicated by the interface Ij will be called the script for the item of domestic equipment with which the interface Ij is associated.

Thus, another advantage of the invention is that it proposes an electronic means for storing, retrieving and displaying information relating to the domestic equipment.

As mentioned above, the electronic form held in an interface Ij (j=1, 2, ..., n) is made up of computer data and of means allowing this computer data to be stored and communicated.

The means allowing the computer data to be stored and communicated can be formed merely by memory circuits containing the data. They can also be formed by memory circuits and a microprocessor for more complex applications, such as the creation of documents resulting from a program being executed.

All or some of the computer data is made up of the following data:

A set of pages and/or page parts using the mark-up language used for creating documents within the hypermedia system commonly called the worldwide web. This mark-up language will subsequently be called HTML (Hyper Text Mark-up Language). These pages thus contain the static information relating to the appliance, that is to say data which does not change over time, and programs allowing this data to be accessed, such as programs known as Java programs and JavaScript programs.

A set of declarations, or meta-information, allowing all or some of the page parts to be aggregated using the control device CTR. For example, the descriptors for a plurality of appliances can each comprise a volume setting function, which is identified by a particular function type. The controller CTR can thus set up single page of information containing all the audio volume setting for the appliances in question, by recognizing the function type in the descriptors.

A set of programs allowing dynamic pages to be created or allowing dynamic information to be retrieved. As an example, these may be programs known on the worldwide web, such as the Java program, the JavaScript program, or else the CGI (Common Gateway Interface) program.

The number of computer tools which are compatible with HTML is very large. Advantageously, it follows that the description of the pages and page parts utilizing HTML can be designed using a great variety of computer tools. As an example, when information is shown in the form of images, the standards commonly called GIF, JPEG or else MPEG can be used for coding the information. The acronyms GIF, JPEG and MPEG stand for <<Graphic Interchange Format>>, <<Joint Photographic Expert Group>> and <<Moving Picture Expert Group>>, respectively.

The device CTR is, for example, a digital decoder equipped with an IEEE 1394 interface (reference 10 in FIG. 1) connecting it to the communication bus. The decoder is provided with a microprocessor 11 and with a memory 12 for loading, processing and storing the descriptors and the programs which it contains. The microprocessor, the bus interface and the memory are connected to an internal bus 13. The decoder also has a character generator 14 for generating the graphics necessary for displaying the user interfaces and the information.

The descriptor held in the interface Ij is communicated to the control device CTR by means of the network B. As mentioned above, in accordance with the preferred embodiment of the invention, the network B is a data bus, such as the bus defined by IEEE standard 1394.

According to a first embodiment of the invention, the phase of communicating all or some of the descriptor held in an interface Ij to the control device CTR takes place as soon as the interface Ij has been connected to the control device CTR. As an example, when the data bus defined by IEEE standard 1394 is used, this communication phase can be implemented during the automatic data interchange protocol which takes place when the interface Ij is connected to the bus.

According to another embodiment of the invention, the phase of communicating all or some of the descriptor held in the interface Ij takes place at the request of the control device CTR and may be carried out several times on the basis of the same protocol, should this prove to be necessary.

The descriptor held in an interface Ij can be communicated by the communication protocol used for data interchanges between clients and servers on the worldwide web. This communication protocol will subsequently be called HTTP (Hyper Text Transfer Protocol). According to the invention, however, other communication protocols may be used. For example, the phase of connecting an appliance to the IEEE 1394 bus has a data interchange phase which can be used to this end.

With the hypermedia system commonly called the worldwide web, the HTTP uses the services of a protocol stack commonly called the TCP/IP stack (the acronym TCP/IP stands for <<Transmission Control Protocol/Internet Protocol>>). The TCP/IP stack is relatively costly to install. One advantage of the invention is that it allows the use of protocols other than those of the TCP/IP stack to support the HTTP.

When all or some of the descriptor is communicated from an interface Ij to the control device CTR, the latter inserts pages and/or page parts in HTML into its tree structure. The <<tree structure>> of the control device should be understood as meaning the set of pages which the control device allows to be linked to one another and displayed as a result of a graphics or text symbol being activated.

Each page in HTML is identified by an address. According to a first embodiment of the invention, among the pages in HTML which are inserted into the tree structure of the control device there is at least one header page containing the list of the addresses of the various pages. When consulted, this header page allows any HTML page to be retrieved using the address of the HTML page.

According to another embodiment of the invention, it is also possible to insert into the tree structure of the control device an HTML page assembling a list of pointers, with each pointer corresponding to an address for an HTML page describing the appliance. When consulted, the HTML page assembling the list of pointers thus allows any HTML page to be retrieved using the pointer corresponding to the address of the page.

Advantageously, the HTML page containing the list of the addresses or the HTML page assembling the list of the pointers provide the user with easy access to the various information relating to the appliances used. Furthermore, these HTML pages can be easily modified. It is thus possible to update them, without any difficulty, when a new appliance is connected to the network B.

It is also possible, according to the invention, to create a page listing the appliances connected to the network B. A graphics object formed by a line of text and/or by a drawing can thus be used to indicate the presence of an appliance, which is equivalent to its descriptor being inserted into the tree structure of the control device. This graphics object can be used to direct the user towards new specific pages relating to the appliance. This page is advantageously created by the control device on the basis of the set of descriptors loaded from the appliances.

The use of HTML has the advantage of allowing the user to choose how to show the information which he wishes to display. Thus, for example, this manner of showing information may be made consistent for the same kind of information, such as information relating to the audio level of various appliances or information relating to the power consumed by various appliances.

According to an improvement to the embodiment of the invention, an interface Ij can contain a set of declarations allowing the appliance which is associated with it to be configured as a source and/or as a receiver of data, such as audio and/or video data.

The control device CTR then comprises means for creating configuration pages allowing a declaration to be made of which appliance is being used and what its function is (transmitter for a first signal (audio, video, etc.) or data list or receiver for a second list) as well as pages suggesting the possible connections between various appliances or providing the user with a means allowing him to specify the connection or connections which he wishes to set up between various appliances.

As a non-limiting example, a television set can be declared as being an audio transmitter and a hi-fi system can be declared as being an audio receiver. The descriptor for the television set then has a declaration to the effect that the appliance can be an audio source (and also a video signal source, an audio receiver and a video signal receiver, etc.). The control device CTR can then construct a configuration page describing this situation.

When a control unit, such as a remote control, is used, the control device CTR advantageously allows all of the domestic appliances connected to the network B to be controlled.

Control is initiated, in a manner known per se, by the user interacting with a graphics object (text and/or symbol) displayed on the screen of the device D.

This interaction is converted into a command by a command program stored in a memory circuit held in the control device. According to the preferred embodiment of the invention, the command program's language is the Java language, for example. According to other embodiments of the invention, it can also be a command language other than one of the command languages known on the worldwide web. Thus, for example, it may be an extension of HTML. Extension of HTML should be understood as meaning the addition to the HTML of certain keywords whose use syntax conforms to the usual syntax of the HTML.

According to the present embodiment, the following syntax is defined for specifying a volume setting function:

<COMMAND MIN=0, MAX=100, DELTA=1, LABEL='Volume', PROTOCOL='AV/CTS', IDENT='MY IDENTIFIER'> where 'COMMAND' denotes the function type, namely a command, MIN and MAX define the minimum and maximum setting values, respectively, DELTA defines the increment, LABEL defines the name to be given to the function, PROTOCOL defines the protocol used to control the appliance in question and IDENT defines an identifier for the appliance calling the function.

Furthermore, the JavaScript language can be used to write the user interaction program.

Using an extension of HTML to cover all or some of the setting commands for the appliances connected to the network B advantageously allows the symbols representing the same kind of commands to be made consistent. This simplifies the control of different appliances.

Initially, the command program for a domestic appliance is held in the interface which is associated with it. When the descriptor is communicated to the control device CTR, the command program is loaded into the control device, which is then able to execute it.

Figure 2:
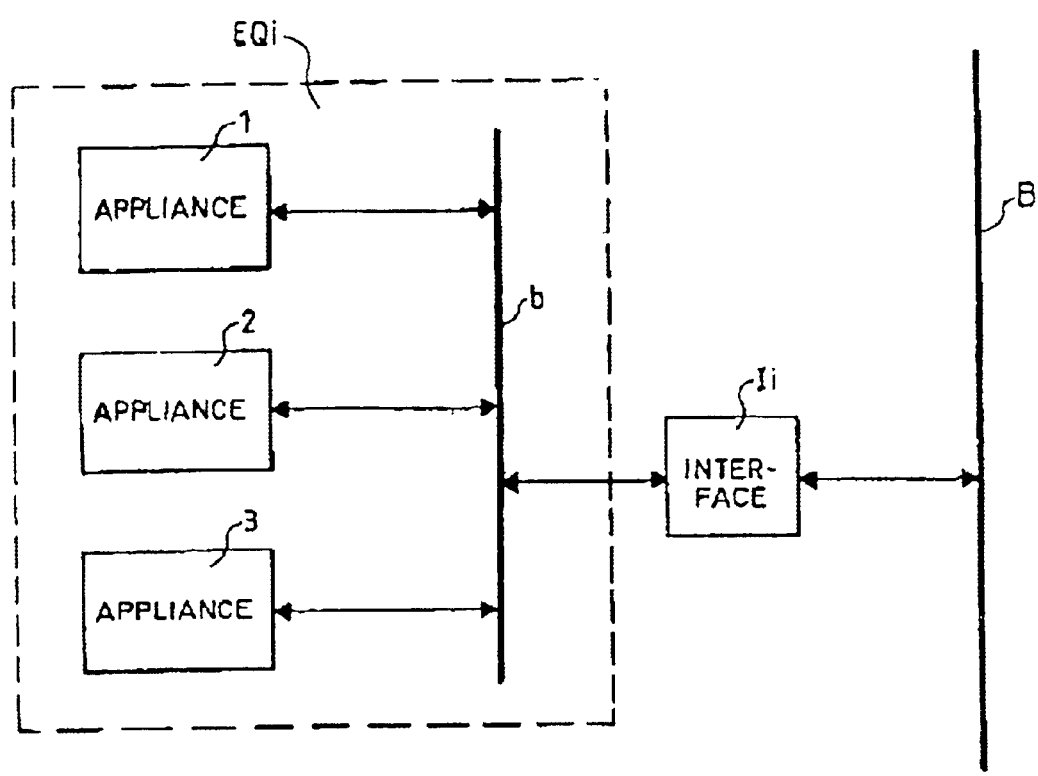
FIG. 2 shows a detailed view of a specific item of domestic equipment according to the invention.

FIG. 2 shows a detailed view of a particular item of domestic equipment according to the invention.

The element shown in FIG. 2 is made up of an item of domestic equipment EQi and an interface Ii associated with the item of domestic equipment EQi.

As a non-limiting example, the item of domestic equipment EQi comprises three electrical appliances 1, 2, 3, such as those mentioned previously. In a more general way, however, the item of domestic equipment EQi comprises at least one electrical appliance.

The electrical appliances 1, 2, 3 are connected to the interface Ii by means of an electrical network b. The electrical network b can be made up of a set of electrical wires, for example.

The interface Ii contains all of the descriptors for the appliances 1, 2, 3 as well as various circuits allowing the data passed over the network B to be converted into quantities which are compatible with the electrical appliances.

Figure 3:
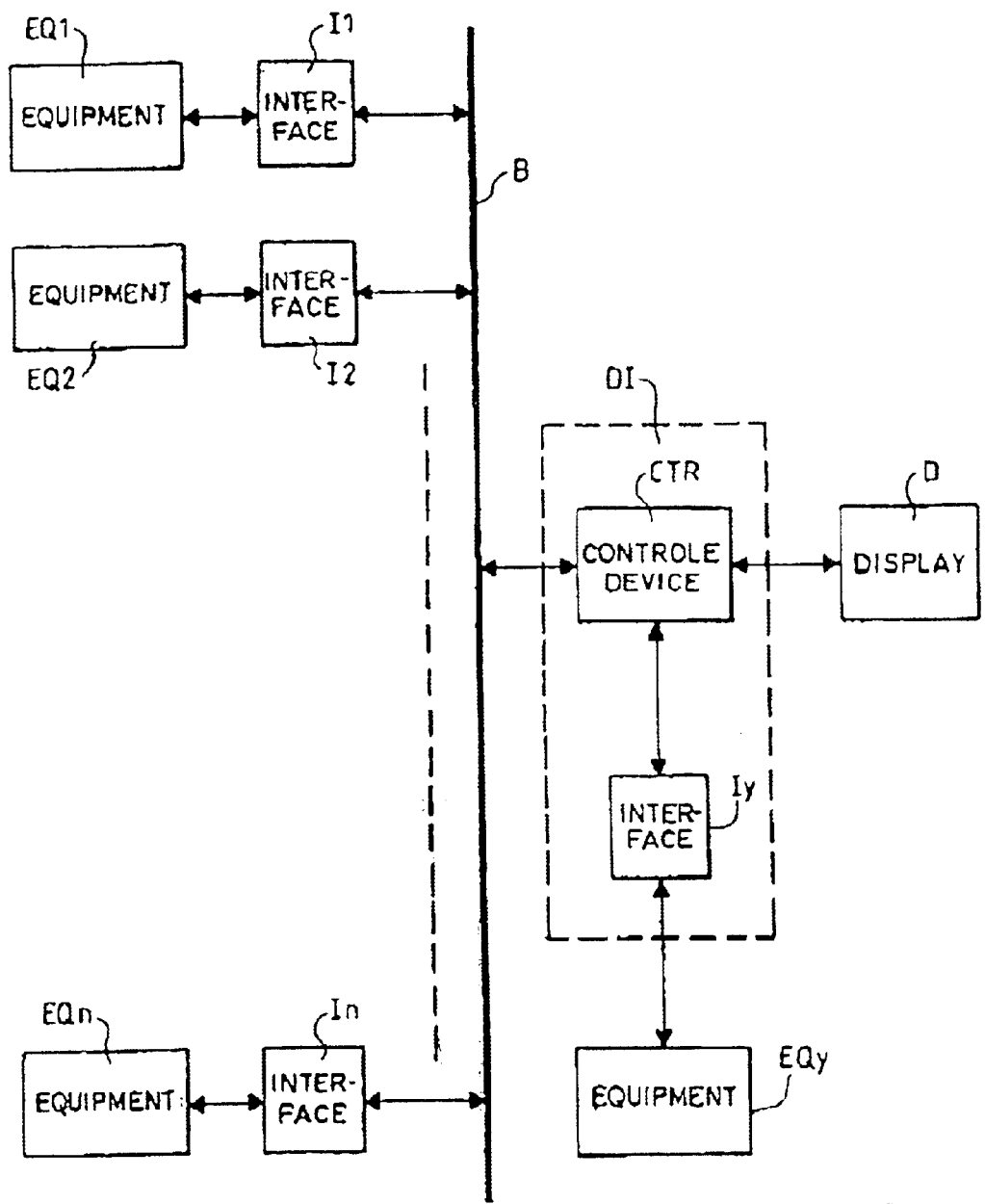
FIG. 3 shows a system for controlling domestic equipment using a graphical screen display according to a second embodiment of the invention.

FIG. 3 shows a system for controlling domestic equipment using a graphical screen display according to a second embodiment of the invention.

In addition to the elements listed in FIG. 1, the control system shown in FIG. 3 comprises an item of domestic equipment EQy and an interface Iy.

The item of domestic equipment EQy is formed by at least one electrical appliance, such as those mentioned above. The interface Iy contains all of the descriptors for the electrical appliances forming the item of domestic equipment EQy.

The interface Iy is then connected directly to the control device CTR by electrical wires. According to this embodiment of the invention, the information interchanged between the electrical appliances forming the item of equipment EQy and the control device CTR is no longer passed over the network B.

This embodiment can be particularly advantageous for certain particularly simple electrical appliances, such as circuit breakers, because it is then not necessary to convert simple electrical quantities, such as a voltage value or a current value, into data which is compatible with the network B.

According to a particular embodiment, the interface Iy and the control device CTR can then be integrated into a single device DI.

Figure 4:
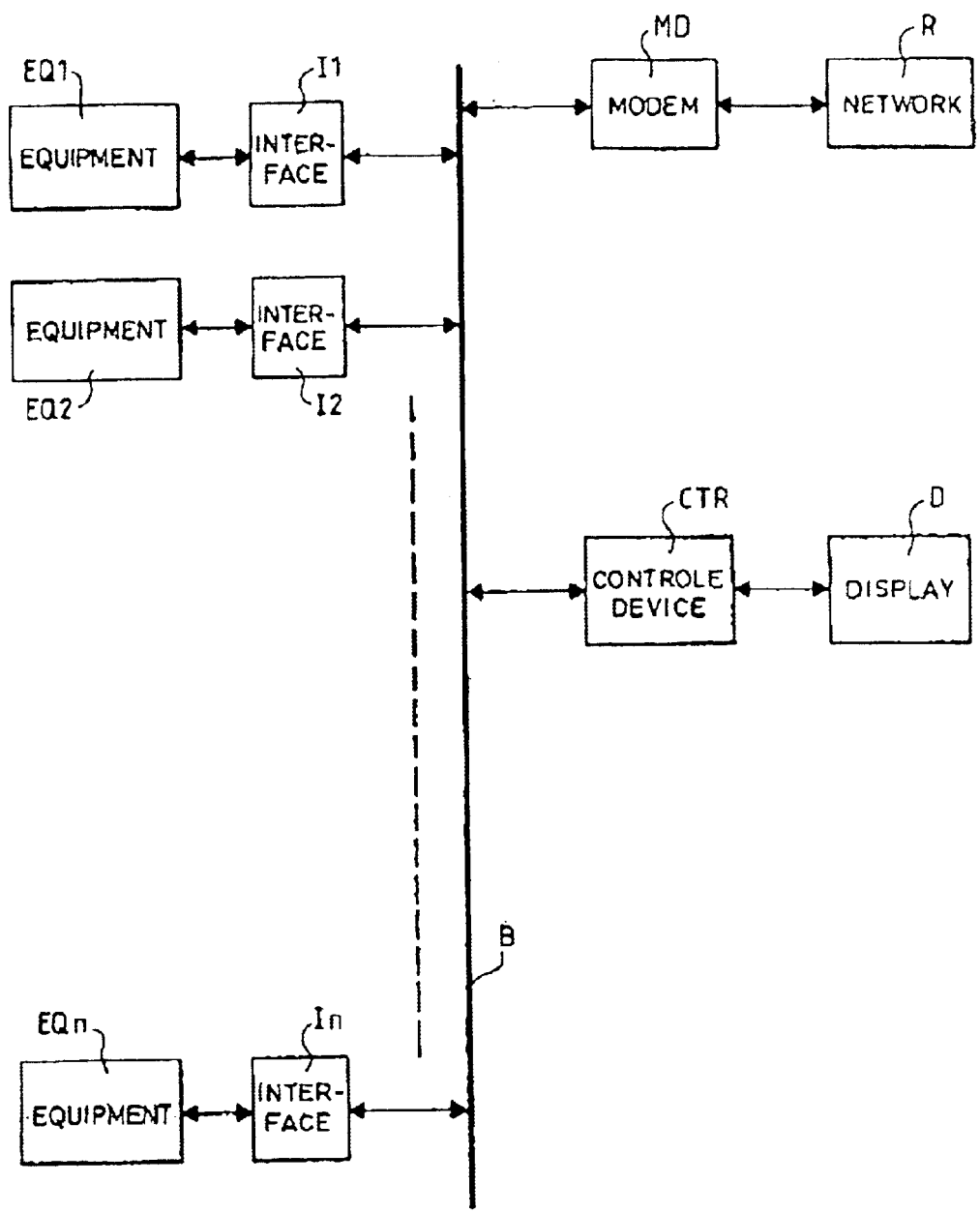
FIG. 4 shows an improvement to the systems shown in FIGS. 1 and 3.

FIG. 4 shows an improvement to the system shown in FIGS. 1 and 3.

In addition to the elements described in FIG. 1, the system shown in FIG. 4 comprises a modem MD which is connected, on the one hand, to the bus B and, on the other hand, to a network R which is external to the set formed by the domestic equipment EQj, the interfaces Ij, the network B, the control device CTR and the display device D. The network R may be a telephone network, for example.

According to the preferred embodiment of the improvement shown in FIG. 4, all or some of the descriptor for at least one item of domestic equipment is communicated by means of a reference commonly used on the worldwide web to specify the physical location of a file or resource. This reference will subsequently be called the URL (Uniform Resource Locator).

The control device can then go and retrieve the required document from the indicated location via the modem MD and the network R using the URL. During this operation, various protocols may be used, such as HTTP, BOOTP, FTP and TFTP. The acronyms BOOTP, FTP and TFTP stand for <<Boot Protocol>>, <<File Transfer Protocol>> and <<Trivial File Transfer Protocol>>, respectively.

HTTP is a relatively costly protocol. Advantageously, it is not imperative for the descriptor communication phase, as mentioned above, to be carried out on the basis of HTTP.

Another advantage of the embodiment shown in FIG. 4 is the updating of the information in one or more descriptors for domestic equipment using the modem MD connected to the network R. Advantageously, new information relating to the domestic equipment can thus be made accessible to the user. This updating function is particularly useful, for example, in the case of commercial information such as that mentioned above, or else in the case of information relating to the safety of the appliance.

The modem shown in FIG. 4 is a device in itself, separate from the other equipment. The invention also relates to other configurations, such as those in which the modem is contained in a telephone answering machine or in a terminal which allows access to the hypermedia system formed by the worldwide web.

What is claimed is:

1. Control device in a home network including a plurality of appliances, wherein each appliance has an associated descriptor comprising information for controlling said appliance, said control device including:

a microprocessor for loading and processing descriptors associated with the appliances, wherein said descriptors each comprise at least one control function of a respective appliance, and a corresponding control function type associated with each of said at least one control function, from among a plurality of control function types;

a graphics generator for generating a display of a markup language page or page parts based on said descriptors, said control device using descriptors of a plurality of appliances to recognize and aggregate appliance control functions of the same type for a plurality of appliances, based on the recognition, in order to display said aggregated functions on a single markup language page.

2. Device according to claim 1, wherein said microprocessor is programmed to load a descriptor directly from the appliance with which it is associated, said descriptor being stored in a memory in this appliance.

3. Device according to claim 1, wherein said microprocessor is programmed to load a descriptor from an internet server located on a different network from said home network, the address of the descriptor being loaded from the appliance with which the descriptor is associated.

4. Device according to claim 1, wherein said descriptor contains at least one of the following functions: display of static information relating to the appliance, display of dynamic information relating to the appliance, or display of an object for controlling a function of the appliance.

5. Device according to claim 4, wherein, when said descriptor contains an object for controlling a function of an appliance, as well as a program for generating a corresponding command to be transmitted to the appliance with which the set is associated.

6. Device according to claim 1, wherein said descriptor comprises configuration data identifying an appliance as a source or receiver of a data type, said microprocessor being programmed to create at least one configuration page for allowing the user to specify the connections between appliances, and wherein the at least one configuration page indicates possible connections.

7. Method of controlling at least one appliance in a domestic communication network having a control device connected to a display device, comprising the steps of:

loading descriptors, wherein said descriptors each comprise at least one control function of a respective appliance, and a corresponding control function type associated with each of said at least one control function, from among a plurality of control function types, recognizing control functions of the same type in descriptors for a plurality of appliances and aggregating said recognized control functions of the same type; and creating at least one markup language page comprising aggregated appliance control functions of the same type for a plurality of appliances based on the recognizing step.

8. Method according to claim 7, wherein a descriptor is loaded from a internet server located on a network different from said home network based on an address provided by an appliance associated with said descriptor.

9. A system for controlling at least one appliance in a network, comprising:

a control device; and at least one appliance coupled to the control device, wherein the at least one appliance has at least one associated descriptor which is transmitted to the control device and displayed by the control device, wherein the at least one appliance has at least one associated descriptor which is transmitted to the control device and displayed by the control device, wherein said at least one descriptor comprises at least one control function of a respective appliance, and a corresponding control function type associated with said at least one control function from among a plurality of control function types, and wherein the control device is using associated descriptors from a plurality of appliances to recognize and aggregate appliance control functions of the same type for a plurality of appliances based on the recognition in order to display aggregated functions on a single markup language page of display of the control device.

10. The system of claim 9, further comprising at least one interface circuit coupled between the at least one appliance and the control device.

11. The system of claim 10, wherein the at least one interface circuit is adapted to store the at least one associated descriptor therein.

* * * * *